(No Model.)

C. M. BRYAN.
DISH WASHING AND DRAINING MACHINE.

No. 422,371. Patented Mar. 4, 1890.

Witnesses:
M. P. Smith.
R. H. Orwig.

Inventor:
Catherine M. Bryan,
By Thomas G. Orwig, Atty.

UNITED STATES PATENT OFFICE.

CATHARINE M. BRYAN, OF NEW SHARON, IOWA.

DISH WASHING AND DRAINING MACHINE.

SPECIFICATION forming part of Letters Patent No. 422,371, dated March 4, 1890.

Application filed October 7, 1889. Serial No. 326,274. (No model.)

*To all whom it may concern:*

Be it known that I, CATHARINE M. BRYAN, a citizen of the United States of America, residing at New Sharon, in the county of Mahaska and State of Iowa, have invented a new and Improved Dish-Washing Machine, of which the following is a specification.

My object is to facilitate the washing and draining and carrying of dishes such as are in daily use in serving meals and require washing after each meal before placing them in a closet or cupboard.

My invention consists in the construction of a wire basket adapted for carrying dishes and provided with a shaft and handle for pivoting and rotating it, an adjustable spring and cover for fastening dishes in the basket, and a vessel and detachable vessel-cover, as hereinafter set forth, pointed out in my claim, and illustrated in the accompanying drawings, in which—

Figure 1:
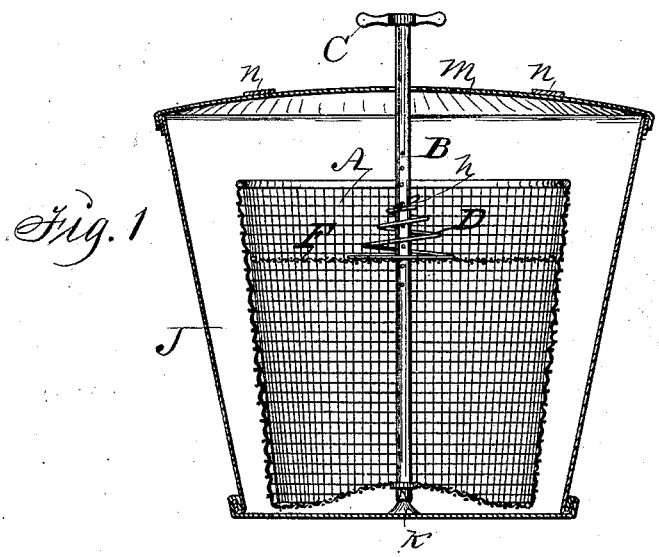
Figure 2:
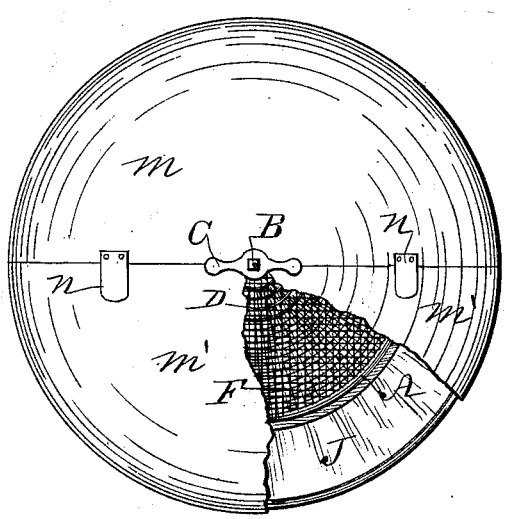
Figure 3:
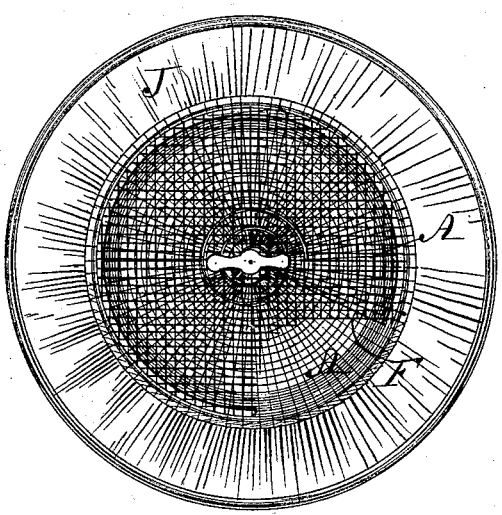

Figure 1 is a vertical section of my machine, showing the relative positions of all the parts as required in washing dishes therewith. Fig. 2 is a top view of the complete machine, showing part of the vessel-cover broken away to disclose the basket and dish-cover within the vessel. Fig. 3 is a top view of the wire basket and the adjustable spring and dish-cover combined therewith.

A represents an open-topped basket made of wire. It may vary in configuration and size, as desired; but it is preferably wider at the top than at the bottom.

B is a metal tube fixed to the center of the bottom of the basket, which center is bowed upward to allow the lower end of the tube to project below the bottom, as shown in Fig. 1, so that the basket can be pivoted in a vessel and rotated without friction on the bottom of the basket, and also to allow the circumference of the bottom of the basket to rest upon a flat surface when the basket is to be placed on a table or other support. The tubular shaft B extends vertically above the top of the basket and is provided with a handle C, adapted for lifting and also rotating the basket.

D is a convolute spiral spring, and F a dish-cover adjustably and concentrically connected with the shaft or tube B in such a manner that they can be raised, as required, to admit dishes to be placed within the basket, and also, as required, to be lowered to fasten the dishes so they will remain stationary within the basket while it is carried about and when it is rotated within a tub or vessel adapted therefor. Perforations in the tube allow a pin $h$ to be projected through to lock the cover F to the tube at different points of elevation.

J is a water-tight vessel conforming in shape with the wire basket, but is larger in size, as required, to inclose the basket. It is preferably made of tin and flat-bottomed to adapt it to be placed on a stove, so that water can be heated therein whenever desired.

K is a cone-shaped pivot fixed to the center of the bottom of the vessel J in such a manner that it will enter the open end of the tube B, that projects below the bottom of the basket to support the basket when it is placed within the vessel to be rotated.

$m$ and $m'$ are mating sections of a cover fitted in the top of the vessel to retain the heat of the water and to serve as a bearing for the shaft or tube B, that projects above the top of the vessel when the basket is placed within the vessel.

$n$ and $n'$ are metal plates or clasps fixed on top of the straight edge of one of the cover-sections to overlap the contiguous edge of the other section when they are placed on the vessel.

In the practical use of my invention I place cups, saucers, dinner-plates, knives and forks, spoons, &c., in the basket to carry them and to wash and drain them. When I have put them in the basket, I fasten the cover F and spring D on top of them, and then place the basket within the vessel to be supported upon the pivot at the center of the bottom of the vessel, and when hot water or soapsuds in the vessel covers the dishes I rotate the basket in reverse ways by means of the tubular shaft and handle until the action of the water upon the dishes cleanses them, and after the dishes are thus quickly washed I lift the basket and drain them and carry them to a table or wherever they are to be taken out of the basket and dried and stored away.

I am aware a wire basket, a standard, and a disk have been detachably combined and placed in a water-tight vessel having a cover formed in two parts in such a manner that the basket could be rotated to wash dishes therein, but not lifted by means of the standard or rotating shaft for draining and carrying the dishes. I am also aware that a vessel adapted to be rocked had a central opening and the cover for said opening had a coiled spring attached to project downward to engage dishes, but no means for regulating the pressure or preventing the spring from pressing the cover upward when the vessel was half-full of dishes. My manner of fixing a standard or shaft to a basket having a concave bottom adapts the basket for carrying dishes, placing the basket on the flat surface of a stove or table, and also for rotating it in a water-tight vessel, and my manner of adjustably connecting a disk-cover and a spring with the fixed shaft and the basket is novel and greatly advantageous in carrying, washing, and draining dishes.

I claim as my invention—

The basket A, having a perforated shaft fixed to the center of its bottom to project perpendicularly above the top of the basket, a handle C, fixed to the top of the shaft, a disk F, a spring D, and pin $h$, constructed and combined with a vessel having a fixed pivot K on its bottom, and a detachable cover formed in two parts, substantially as shown and described, for the purposes stated.

CATHARINE M. BRYAN.

Witnesses:
C. H. KRAMER,
W. A. BRYAN.